(12) United States Patent
Jeong

(10) Patent No.: US 8,460,574 B2
(45) Date of Patent: Jun. 11, 2013

(54) ANTISTATIC ADHESIVE COMPOSITION, ADHESIVE FILM USING THE SAME, METHOD FOR PRODUCING THE ADHESIVE FILM, AND METHOD OF FABRICATING LIQUID CRYSTAL DISPLAY

(75) Inventor: Eun Hwan Jeong, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 457 days.

(21) Appl. No.: 12/654,663

(22) Filed: Dec. 29, 2009

(65) Prior Publication Data

US 2010/0163166 A1 Jul. 1, 2010

(30) Foreign Application Priority Data

Dec. 30, 2008 (KR) .................. 10-2008-0137017
Nov. 13, 2009 (KR) .................. 10-2009-0109943

(51) Int. Cl.
*C09K 3/16* (2006.01)
*C08L 31/00* (2006.01)
*C08L 33/08* (2006.01)

(52) U.S. Cl.
USPC ............ 252/182.13; 252/182.11; 252/182.12; 252/182.2; 252/182.21; 524/556; 524/428

(58) Field of Classification Search
USPC ............... 252/182.11, 182.12, 182.13, 182.2, 252/182.21; 524/543, 556, 599, 428
See application file for complete search history.

(56) References Cited

U.S. PATENT DOCUMENTS

| | | | | |
|---|---|---|---|---|
| 4,698,391 A | * | 10/1987 | Yacobucci et al. | 525/162 |
| 2003/0114560 A1 | * | 6/2003 | Yang et al. | 524/154 |
| 2008/0213585 A1 | * | 9/2008 | Moroishi et al. | 428/355 AC |

FOREIGN PATENT DOCUMENTS

GB 2028168 A * 3/1980

* cited by examiner

*Primary Examiner* — Karuna P Reddy
(74) *Attorney, Agent, or Firm* — Lee & Morse, P.C.

(57) ABSTRACT

An antistatic adhesive composition, an adhesive film produced using the same, a method for producing the adhesive film, and a method of fabricating a liquid crystal display, the antistatic adhesive composition including 100 parts by weight of a (meth)acrylic adhesive resin, the resin having functional groups capable of bonding with a cross-linking agent, about 0.01 to about 15 parts by weight of a cross-linking agent, and about 0.1 to about 10 parts by weight of a quaternary ammonium salt, the quaternary ammonium salt being obtained by reacting an amine having two or more terminal hydroxyalkyl groups with one of an organic or inorganic acid.

17 Claims, No Drawings

ANTISTATIC ADHESIVE COMPOSITION, ADHESIVE FILM USING THE SAME, METHOD FOR PRODUCING THE ADHESIVE FILM, AND METHOD OF FABRICATING LIQUID CRYSTAL DISPLAY

BACKGROUND

1. Field

Embodiments relate to an antistatic adhesive composition, an adhesive film produced using the same, a method for producing the adhesive film, and a method of fabricating a liquid crystal display.

2. Description of the Related Art

In recent years, liquid crystal displays including polarizers have become increasingly lightweight and thin. Liquid crystal displays are currently used in various applications, e.g., notebooks, monitors, and TVs, due to their reduced weight and thickness.

Generally, a polarizer and a liquid crystal cell filled with a liquid crystal may be essential elements of, and included during fabrication of, a liquid crystal display. The use of a suitable bonding layer or adhesive layer may be required to attach these and other elements to each other.

Static electricity may be generated when a release film is peeled from the adhesive layer to attach the polarizer to the liquid crystal cell during fabrication of the liquid crystal display. The static electricity may affect alignment of the liquid crystal within the liquid crystal cell, thus causing defects in the liquid crystal display. Further, foreign matter may be introduced between the liquid crystal cell and the adhesive by the electrostatic attractive force, thus posing a danger of contamination.

An antistatic layer may be formed on an outer surface of the polarizer to, e.g., inhibit the generation of static electricity. However, the antistatic effect of the antistatic layer may be insufficient to completely prevent generation of static electricity. Thus, the adhesive may also have an antistatic function in order to inhibit the generation of static electricity.

Many methods have been proposed for imparting antistatic properties to adhesives, e.g., addition of an electrically conductive material to an adhesive or use of an ionic acrylic copolymer in an adhesive.

The electrically conductive material may be an electrically conductive polymer, e.g., polythiophene, polypyrrole, or polyaniline. A metal oxide may be used as the conductive material. Particulate carbon may also be used as the conductive material. Imparting antistatic properties to an adhesive by using a metal salt or an organic salt may be possible. Introducing ion sites into side chains of a polymer may impart antistatic properties to an adhesive.

SUMMARY

Embodiments are directed to an antistatic adhesive composition, an adhesive film produced using the same, a method for producing the adhesive film, and a method of fabricating a liquid crystal display, which substantially overcome one or more of the problems due to the limitations and disadvantages of the related art.

It is a feature of an embodiment to provide an antistatic adhesive composition including quaternary ammonium salt that is highly soluble in, and highly compatible with, a solution of the adhesive composition.

It is another feature of an embodiment to provide an antistatic adhesive composition including an ionic liquid compound having one or more reactive functional groups capable of reacting with a cross-linking agent and being cross-linked with an adhesive resin, thus achieving good antistatic properties and excellent characteristics, e.g., high endurance reliability, while eliminating the risk of bleeding of the components into the surface of the adhesive layer.

At least one of the above and other features and advantages may be realized by providing an antistatic adhesive composition including 100 parts by weight of a (meth)acrylic adhesive resin, the resin having functional groups capable of bonding with a cross-linking agent, about 0.01 to about 15 parts by weight of a cross-linking agent and about 0.1 to about 10 parts by weight of a quaternary ammonium salt, the quaternary ammonium salt being obtained by reacting an amine having two or more terminal hydroxyalkyl groups with one of an organic or inorganic acid.

The quaternary ammonium salt may be represented by Formula 1:

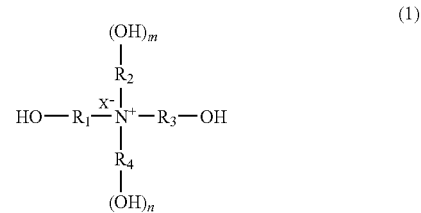

(1)

wherein $R_1$ and $R_3$ may each independently be $C_2$-$C_{12}$ linear alkyl, $C_2$-$C_{12}$ branched alkyl, alkoxyalkyl, or carboxyalkyl, $R_2$ and $R_4$ may each independently be hydrogen, $C_1$-$C_{12}$ linear alkyl, $C_1$-$C_{12}$ branched alkyl, alkoxyalkyl, or carboxyalkyl, m and n may each independently be 0 or 1, and X may be a counter anion derived from the organic or inorganic acid.

The amine may include at least one of an amine monomer, the amine monomer having two or more $C_2$-$C_{12}$ hydroxyalkyl groups, and a tertiary amine oligomer, the tertiary amine oligomer having a substituent including at least one of an ether group and an ester group.

The tertiary amine oligomer may have a weight average molecular weight of about 500 to about 2,000.

The quaternary ammonium salt may be obtained by reacting the amine having two or more terminal hydroxyalkyl groups with the organic acid, the organic acid including at least one of p-toluenesulfonic acid, monochloroacetic acid, dichloroacetic acid, trichloroacetic acid, trifluoroacetic acid, and trifluoromethanesulfonic acid.

The quaternary ammonium salt may be obtained by reacting the amine having two or more terminal hydroxyalkyl groups with the inorganic acid, the inorganic acid including at least one of HCl, HF, HBr, HI, $CH_3I$, $H_2SO_4$, and $H_3PO_4$.

The (meth)acrylic adhesive resin may include a copolymer, the copolymer including a $C_4$-$C_{12}$ alkyl (meth)acrylate, and a polymerizable monomer having a functional group including at least one of a carboxyl group, a hydroxyl group, an amide group, and a tertiary amine group.

The copolymer may further include a comonomer.

The copolymer may include about 80 to about 99% by weight of the $C_4$-$C_{12}$ alkyl (meth)acrylate, about 1 to about 10% by weight of the polymerizable monomer having a functional group including at least one of a carboxyl group, a hydroxyl group, an amide group, and a tertiary amine group, and about 10% by weight or less of the comonomer.

The (meth)acrylic adhesive resin may have a weight average molecular weight of about 50,000 to about 2,000,000.

The cross-linking agent may include at least one of an isocyanate compound, an epoxy compound, an aziridine compound, and a metal chelate.

The antistatic adhesive composition may further include a silane coupling agent.

The composition may include about 0.01 to about 1 part by weight of the silane coupling agent, based on 100 parts by weight of the (meth)acrylic adhesive resin.

The silane coupling agent may contain at least one epoxy group.

The antistatic adhesive composition may further include an additive, the additive including at least one of curing accelerators, ionic liquids, inorganic fillers, softeners, antioxidants, anti-aging agents, stabilizers, stickiness-imparting resins, modified resins, leveling agents, defoaming agents, plasticizers, dyes, pigments, processing agents, UV blocking agents, fluorescent whitening agents, dispersants, heat stabilizers, light stabilizers, UV absorbers, antifungal agents, alkali metal salts, lubricants, and solvents.

At least one of the above and other features and advantages may also be realized by providing an adhesive film, the adhesive film including the antistatic adhesive composition according to an embodiment.

At least one of the above and other features and advantages may also be realized by providing a method for producing an adhesive film, the method including preparing the antistatic adhesive composition according to an embodiment, and applying the antistatic adhesive composition to a release film.

Preparing the antistatic adhesive composition may include forming a quaternary ammonium salt, forming the quaternary ammonium salt including reacting an amine having two or more terminal hydroxyalkyl groups with one of an organic or inorganic acid, and mixing the quaternary ammonium salt with a cross linking agent and a (meth)acrylic adhesive resin, the resin having functional groups capable of bonding with the cross-linking agent.

At least one of the above and other features and advantages may also be realized by providing a method of fabricating a liquid crystal display, the method including providing an adhesive film including a release film and an antistatic adhesive composition, the composition including 100 parts by weight of a (meth)acrylic adhesive resin, the resin having functional groups capable of bonding with a cross-linking agent, about 0.01 to about 15 parts by weight of a cross-linking agent, and about 0.1 to about 10 parts by weight of a quaternary ammonium salt, the quaternary ammonium salt being obtained by reacting an amine having two or more terminal hydroxyalkyl groups with one of an organic or inorganic acid, removing the release film from the adhesive film; and bonding a polarizer to a liquid crystal cell using the adhesive film from which the release film has been removed.

DETAILED DESCRIPTION

Korean Patent Application No. 10-2008-0137017, filed on Dec. 30, 2008, and 10-2009-0109943, filed on Nov. 13, 2009, in the Korean Intellectual Property Office, and entitled: "Antistatic Adhesive Composition, Adhesive Film Using the Adhesive Composition and Method for Producing the Adhesive Film," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

The terms as used herein are defined by taking functions into account and may be changed according to the custom or intention of users or operators. Therefore, definition of the terms should be made according to the overall disclosures set forth herein.

According to an embodiment, an antistatic adhesive composition may include a (meth)acrylic adhesive resin having functional groups capable of bonding with a cross-linking agent, a cross-linking agent, and a quaternary ammonium salt obtained by reacting an amine having two or more terminal hydroxyalkyl groups with an organic or inorganic acid.

Hereafter, the individual components of the antistatic adhesive composition according to an embodiment will be described in detail.

(Meth)Acrylic Adhesive Resin

A, e.g., (meth)acrylic copolymer, may be used as the adhesive resin. In an implementation, the (meth)acrylic adhesive resin may be a copolymer of, e.g., a $C_4$-$C_{12}$ alkyl (meth)acrylate and a polymerizable monomer having one or more functional groups capable of bonding with the cross-linking agent. In other words, the (meth)acrylic copolymer may be made up of repeating units derived from the $C_4$-$C_{12}$ alkyl (meth)acrylate and the polymerizable monomer having one or more functional groups capable of bonding with the cross-linking agent.

In another implementation, the (meth)acrylic adhesive resin may be a copolymer of, e.g., a $C_4$-$C_{12}$ alkyl (meth)acrylate, a polymerizable monomer having one or more functional groups capable of bonding with the cross-linking agent, and a comonomer. In other words, the (meth)acrylic copolymer may be made up of repeating units derived from the $C_4$-$C_{12}$ alkyl (meth)acrylate, the polymerizable monomer having one or more functional groups capable of bonding with the cross-linking agent, and the comonomer.

The term '(meth)acrylic' as used herein is defined to include both methacrylic and acrylic.

The $C_{4-12}$ alkyl (meth)acrylate may include, e.g., n-butyl (meth)acrylate, 2-butyl (meth)acrylate, t-butyl (meth)acrylate, pentyl (meth)acrylate, octyl (meth)acrylate, 2-ethylhexyl (meth)acrylate, nonyl (meth)acrylate, decyl (meth)acrylate, and lauryl (meth)acrylate. These alkyl (meth)acrylates may be used alone or as a mixture of two or more thereof. Preferably, the $C_{4-12}$ alkyl (meth)acrylate includes, e.g., n-butylacrylate, 2-ethylhexylacrylate, or a mixture thereof.

The polymerizable monomer may have one or more functional groups capable of bonding with the cross-linking agent. The functional groups may include, e.g., carboxyl groups, hydroxyl groups, amide groups, and/or tertiary amine groups.

The polymerizable monomer having one or more carboxyl groups may include, e.g., monocarboxylic acids, such as (meth)acrylic acid and crotonic acid; dicarboxylic acids, such as maleic acid and fumaric acid; monoalkyl esters of such dicarboxylic acids; 3-(meth)acryloylpropionic acid; ring-opened adducts of succinic anhydride and 2-hydroxy($C_2$-$C_3$) alkyl (meth)acrylate; ring-opened adducts of succinic anhydride and polyoxy($C_2$-$C_4$)alkylene glycol mono(meth)

acrylate; and ring-opened adducts of succinic anhydride, and/or 2-hydroxy($C_2$-$C_3$)alkyl (meth)acrylate-caprolactone adducts.

The polymerizable monomer having one or more hydroxyl groups may include, e.g., 2-hydroxyethyl (meth)acrylate, 2-hydroxypropyl (meth)acrylate, 2-hydroxybutyl (meth)acrylate, and/or polyoxy($C_2$-$C_4$)alkylene glycol mono(meth)acrylate.

The polymerizable monomer having one or more amide groups may include, e.g., (meth)acrylamide, N-isopropylacrylamide, and/or N-tertiary-butylacrylamide.

The polymerizable monomer having one or more tertiary amine groups may include, e.g., N,N-dimethylaminoethyl (meth)acrylate, N,N-diethylaminoethyl (meth)acrylate, and/or N,N-dimethylaminopropyl acrylate.

The polymerizable monomer preferably includes acrylic acid, 2-hydroxyethyl (meth)acrylate, (meth)acrylamide, or mixtures thereof.

The comonomer may include, e.g., $C_1$-$C_3$ alkyl (meth)acrylates, such as methyl (meth)acrylate, ethyl (meth)acrylate, and isopropyl (meth)acrylate; $C_{13}$-$C_{18}$ alkyl (meth)acrylates, such as tridecyl (meth)acrylate and stearyl (meth)acrylate; (meth)acrylates derived from cyclic alcohols, such as cyclohexyl (meth)acrylate; (meth)acrylates derived from aromatic alcohols, such as benzyl (meth)acrylate; aromatic monomers, such as styrene and vinyltoluene; allyl compounds, such as allyl acetate; monomers having at least one nitrile group, such as (meth)acrylonitrile and α-chloro(meth)acrylonitrile; halogen-containing monomers, such as vinyl chloride and vinylidene chloride; vinyl ether monomers, such as vinyl ethyl ether, vinyl propyl ether and vinyl isobutyl ether; and vinyl ester monomers. These comonomers may be used alone or as a mixture of two or more thereof. Preferably, the comonomer includes methyl (meth)acrylate.

The (meth)acrylic adhesive resin may be a copolymer of about 80 to about 99% by weight of the $C_4$-$C_{12}$ alkyl (meth)acrylate, about 1 to about 10% by weight of the polymerizable monomer, and about 10% by weight or less of the comonomer. In other words, the (meth)acrylic adhesive resin may include, e.g., about 80 to 99% by weight of repeating units derived from the $C_4$-$C_{12}$ alkyl (meth)acrylate, about 1 to about 10% by weight of repeating units derived from the polymerizable monomer, and about 10% by weight or less of repeating units derived from the comonomer.

Maintaining the amount of the repeating units derived from $C_4$-$C_{12}$ alkyl (meth)acrylate at about 80% by weight or greater may help ensure that the (meth)acrylic adhesive resin has sufficient adhesive strength. Maintaining the amount of the repeating units derived from $C_4$-$C_{12}$ alkyl (meth)acrylate at about 99% by weight or less may help ensure that cohesive strength of the (meth)acrylic adhesive resin is not deteriorated. Maintaining the amount of the repeating units derived from the polymerizable monomer at about 1% by weight or greater may help ensure that cohesive strength of the (meth)acrylic adhesive resin is not deteriorated. Maintaining the amount of the repeating units derived from the polymerizable monomer at about 10% by weight or less may help ensure that adhesive strength of the (meth)acrylic adhesive resin is not lowered.

Preferably, the (meth)acrylic adhesive resin is a copolymer of about 90 to 95% by weight of the $C_4$-$C_{12}$ alkyl (meth)acrylate, about 1 to about 5% by weight of the polymerizable monomer, and about 5% by weight or less of the comonomer.

The (meth)acrylic adhesive resin may be prepared by suitable polymerization methods, e.g., bulk polymerization, solution polymerization, emulsion polymerization, and suspension polymerization.

Suitable polymerization initiators that may be used for the preparation of the (meth)acrylic adhesive resin may include, e.g., azo polymerization initiators, such as azobisisobutyronitrile and azobisisovaleronitrile; and/or peroxide polymerization initiators, such as benzoyl peroxide, di-t-butyl peroxide, and lauryl peroxide.

If needed, e.g., a mercapto group-containing chain transfer agent, may be added during preparation of the (meth)acrylic adhesive resin.

In an implementation, the (meth)acrylic adhesive resin may be prepared by, e.g., solution polymerization.

The (meth)acrylic adhesive resin may have a weight average molecular weight of about 50,000 to about 2,000,000. Preferably, the weight average molecular weight is about 100,000 to about 1,800,000. More preferably, the weight average molecular weight is about 500,000 to about 1,500,000. Weight average molecular weight may be on a polystyrene basis, as determined by gel permeation chromatography (GPC).

Cross-Linking Agent

Any suitable cross-linking agent that may be chemically bonded to an ionic liquid compound may be used in an embodiment. The cross-linking agent may enhance cohesive strength of the antistatic adhesive composition and may fix the ionic liquid compound. The cross-linking agent may be bonded to reactive functional groups of the ionic liquid compound.

The cross-linking agent may include, e.g., isocyanate compounds, epoxy compounds, aziridine compounds, and/or metal chelates. The isocyanate compounds may include, e.g., aromatic isocyanates, such as tolylene diisocyanate and xylene diisocyanate; alicyclic isocyanates, such as isophorone; aliphatic isocyanates, such as hexamethylene diisocyanate; and isocyanate adducts. Of these, isocyanate compounds and epoxy compounds are particularly preferred because they may be, e.g., advantageous in obtaining a proper cohesive strength of the antistatic adhesive composition. These compounds may be used alone or as a mixture of two or more thereof.

The isocyanate compounds may include, e.g., polyisocyanate compounds. The polyisocyanate compound may include, e.g., diisocyanate compounds, such as tolylene diisocyanate, xylene diisocyanate, hexamethylene diisocyanate, 2,4-diphenylmethane diisocyanate, and/or 4,4-diphenylmethane diisocyanate.

The isocyanate adducts may include, e.g., aducts of diisocyanates and polyhydric alcohol compounds.

The epoxy compounds may include, e.g., polyepoxy compounds, such as epoxy compounds prepared by, e.g., condensation of bisphenol A with epichlorohydrin.

The cross-linking agent may be included in the composition in an amount of about 0.01 to about 15 parts by weight, based on 100 parts by weight of the (meth)acrylic adhesive resin. Maintaining the amount of the cross-linking agent at about 15 parts by weight or less may help prevent excessive cross-linking reactions, thus reducing residual stress. Maintaining the amount of the cross-linking agent at about 0.01 parts by weight or greater may help ensure a sufficient degree of cross-linking of the (meth)acrylic adhesive resin, thus achieving sufficient cohesive strength of the antistatic adhesive composition. As a result, the physical properties, e.g., adhesion durability and cutting properties, of the antistatic adhesive composition may be maintained. Preferably, the cross-linking agent is included in an amount of about 0.1 to about 10 parts by weight. More preferably, the cross-linking agent is included in an amount of about 0.1 to about 5 parts by weight.

Quaternary Ammonium Salt

The quaternary ammonium salt may be a salt of (a) an amine having two or more terminal hydroxyalkyl groups and (b) an organic or inorganic acid. The quaternary ammonium salt may be, e.g., an ionic liquid. The quaternary ammonium salt may be prepared by, e.g., reacting an amine having two or more terminal hydroxyalkyl groups with the organic or inorganic acid. For example, the quaternary ammonium salt can be prepared by following mechanism:

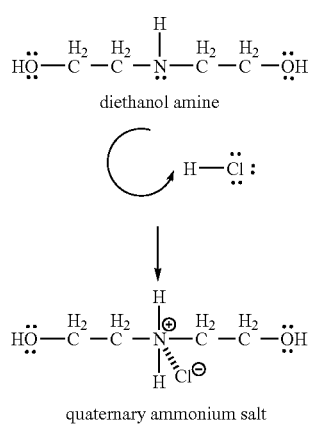

The amine may include, e.g., an amine monomer having two or more $C_2$-$C_{12}$ hydroxyalkyl groups and/or a tertiary amine oligomer having a substituent including at least one of ether groups and ester groups. In an embodiment, the amine may include methyl diethanolamine, methyl dipropanolamine, methyl dibutanol amine, triethanolamine, tripropanolamine, tributanolamine and the like. The tertiary amine oligomer may have a weight average molecular weight of about 500 to about 2,000. Preferably, the amine includes diethanolamine, dipropanolamine, and/or dibutanolamine.

The organic acid may include, e.g., p-toluenesulfonic acid, monochloroacetic acid, dichloroacetic acid, trichloroacetic acid, trifluoroacetic acid, and/or trifluoromethanesulfonic acid.

The inorganic acid may include, e.g., HCl, HF, HBr, HI, $CH_3I$, $H_2SO_4$, or $H_3PO_4$. These inorganic acids may be used alone or as a mixture of two or more thereof.

The quaternary ammonium salt may be represented by Formula 1:

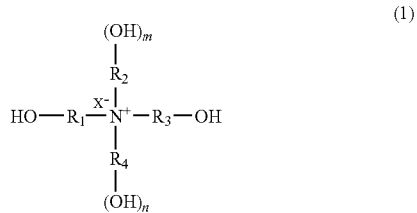

In Formula 1, $R_1$ and $R_3$ may each independently be, e.g., $C_2$-$C_{12}$ linear alkyl, $C_2$-$C_{12}$ branched alkyl, alkoxyalkyl, or carboxyalkyl. In Formula 1, $R_2$ and $R_4$ may each independently be, e.g., hydrogen, $C_1$-$C_{12}$ linear alkyl, $C_1$-$C_{12}$ branched alkyl, alkoxyalkyl, or carboxyalkyl. In Formula 1, m and n may each independently be, e.g., 0 or 1. In Formula 1, X may be, e.g., a free acid. In an implementation, none of $R_1$ to $R_4$ are hydrogen. When a group is hydrogen, no terminal substituent may be attached thereto.

In Formula 1, X- may be a counter anion derived from the corresponding organic or inorganic acid.

The quaternary ammonium salt may be included in the composition in an amount of about 0.1 to about 10 parts by weight, based on 100 parts by weight of the (meth)acrylic adhesive resin. Maintaining the amount of the quaternary ammonium salt at about 10 parts by weight or less may help prevent peeling or voids during, e.g., durability testing. Maintaining the amount of the quaternary ammonium salt at about 0.1 parts by weight or greater may help ensure a sufficient antistatic effect. Preferably, the quaternary ammonium salt is included in an amount of about 0.3 to about 5 parts by weight. More preferably, the quaternary ammonium salt is included in an amount of about 0.3 to about 2 parts by weight.

Silane Coupling Agent

The antistatic adhesive composition may further include, e.g., a silane coupling agent. The silane coupling agent preferably contains at least one epoxy group. The epoxy group of the silane coupling agent may be bonded to the reactive functional groups of the polymer. An alkoxysilane moiety of the silane coupling agent may be strongly bound to a glass substrate of a liquid crystal cell. That is, the silane coupling agent may play a role in connecting the adhesive to the liquid crystal cell to, e.g., improve bonding stability and heat and humidity resistance of the antistatic adhesive composition. In particular, the silane coupling agent may assist in improving adhesion reliability of the antistatic adhesive composition during long-term storage under high temperature and high humidity conditions.

Preferably, the silane coupling agent includes γ-glycidoxypropyltrimethoxysilane.

The silane coupling agent may be included in the composition in an amount of about 0.01 to about 1 part by weight, based on 100 parts by weight of the (meth)acrylic adhesive resin. Maintaining the amount of the silane coupling agent at about 0.01 to about 1 part by weight may help ensure desired adhesion to a cell and reworkability.

Additive

The antistatic adhesive composition of an embodiment may further include at least one additive, so long as desired effects, e.g., antistatic properties, antifouling, adhesive strength, prevention of bleeding, etc., of the antistatic adhesive composition are not sacrificed. The additive may include, e.g., curing accelerators, ionic liquids, inorganic fillers, softeners, antioxidants, anti-aging agents, stabilizers, stickiness-imparting resins, modified resins (polyol modified products of resins, phenolic resins, acrylic resins, polyester resins, polyolefin resins, epoxy resins, epoxylated polybutadiene resins, etc.), leveling agents, defoaming agents, plasticizers, dyes, pigments (color pigments, extender pigments, etc.), processing agents, UV blocking agents, fluorescent whitening agents, dispersants, heat stabilizers, light stabilizers, UV absorbers, antifungal agents, alkali metal salts, lubricants, and/or solvents.

The stickiness-imparting resins may include, e.g., rosin, rosin derivatives, and their hydrogenation products, polyterpene resins, terpene phenolic resins, xylene resins, styrene resins, coumarone-indene resins, $C_5$ petroleum resins, and/or $C_9$ petroleum resins. The plasticizers may include, e.g., carboxylic acid esters, typified by phthalic acid esters, and paraffin chloride. The UV blocking agents may include, e.g., benzophenone UV blocking agents. The antifungal agents may include, e.g., cuprous oxide and/or phenolic compounds. The defoaming agents may include, e.g., alcohol and/or silicon compounds. The alkali metal salts may be added to, e.g., further improve the antistatic properties of the antistatic adhesive composition.

Another embodiment may provide an adhesive film produced using the antistatic adhesive composition. The adhesive film may include, e.g., a base film and one or two adhesive layers formed on one or both surfaces of the base film, the adhesive layers being formed using the antistatic adhesive composition.

The base film may include, e.g., releasable films, insulating films, and/or release papers. The adhesive film may have, e.g., a multilayer structure including one or more additional adhesive layers.

The releasable films and the insulating films may include, e.g., polyesters, such as polyethylene terephthalate, polyolefins, such as polyethylene, polyimides, polyamides, polyether sulfones, polyphenylene sulfides, polyether ketones, and/or triacetyl cellulose.

Another embodiment may provide a method for producing the adhesive film. The method may include, e.g., preparing the antistatic adhesive composition and applying the antistatic adhesive composition to a release film to form an adhesive layer. The antistatic adhesive composition may be diluted with a solvent prior to being applied to the release film. The method may further include drying the adhesive layer.

The solvent is preferably an organic solvent. The solvent may be included in an amount of about 10 to about 100 parts by weight, based on 100 parts by weight of the (meth)acrylic adhesive resin.

Hereinafter, the embodiments will be explained in more detail with reference to the following examples. However, these examples are provided for illustrative purposes only and are not intended to limit the scope.

EXAMPLES

Example 1

100 parts by weight of an adhesive resin (molecular weight=1,500,000) composed of butyl acrylate as a main component and having carboxyl groups, 30 parts by weight of ethyl acetate as a solvent, 0.2 parts by weight of a trimethylolpropane-diisocyanate adduct as a cross-linking agent, 0.1 parts by weight of an epoxy group-containing ethoxysilane as a silane coupling agent, and 0.3 parts by weight of a quaternary ammonium salt as an ionic liquid compound having reactive functional groups, which was prepared by reaction of a tertiary amine (weight average molecular weight=1,000) having three terminal hydroxyalkyl groups, with HCl, were mixed together under stirring for 20 minutes to prepare an antistatic adhesive composition. The antistatic adhesive composition was applied on a release film to obtain an adhesive film.

Example 2

An antistatic adhesive composition was prepared in the same manner as in Example 1, except that 0.4 parts by weight of the quaternary ammonium salt was used.

Example 3

An antistatic adhesive composition was prepared in the same manner as in Example 1, except that 0.5 parts by weight of the quaternary ammonium salt was used.

Comparative Example 1

An antistatic adhesive composition was prepared in the same manner as in Example 1, except that 0.5 parts by weight of an ionic liquid compound (IP-P14, KOEI) having no functional group was used, instead of the quaternary ammonium salt.

Comparative Example 2

An antistatic adhesive composition was prepared in the same manner as in Example 1, except that 0.5 parts by weight of an ionic liquid compound (IL-P20-2, KOEI) having no functional group was used, instead of the quaternary ammonium salt.

Surface Resistance Measurement

The release film was removed from one surface of each of the adhesive films. The surface resistances were measured at three points on the surface of the adhesive layer using a surface resistance meter (MCP-HT450, MITSUBISHI CHEMICAL). The measurements were repeated ten times for each point. The obtained values were averaged. The averages are shown in Table 1.

Endurance Reliability Measurement

The release film was removed from each of the adhesive films. The adhesive layer was adhered to a 185 μm thick iodide polarizer. The resulting structure was cut into two test pieces, each having a size of 100 mm×125 mm. Each of the test pieces was attached to a glass substrate (110 mm×190 mm×0.7 mm) under a pressure of 5 kg/cm². One of the test pieces was allowed to stand at a temperature of 60° C. for 500 hr to evaluate heat resistance of the antistatic adhesive composition. The other test piece was allowed to stand at a relative humidity (RH) of 90% for 500 hr to evaluate humidity resistance of the antistatic adhesive composition. After storage, visual observation was performed to determine whether voids or peeling occurred. The test piece was judged to be "○" when no voids or peeling were observed, "Δ" when slight voids or peeling were observed, and "x" when vigorous voids or peeling were observed.

Metal Corrosion Measurement

The release film was removed from each of the adhesive films. After standing at 23° C. and 50% RH for 7 days, an aluminum foil was attached to the adhesive layer of the adhesive film. After the resulting structure was left standing at 60° C. and 90% RH for 2 days, the aluminum foil was observed for corrosion. The corrosion resistance was judged to be "○" when no change was observed in the aluminum foil, "Δ" when slight whitening was observed in the aluminum foil, and "x" when the aluminum foil was whitened.

TABLE 1

|  | Example No. | | | Comparative Example No. | |
| --- | --- | --- | --- | --- | --- |
|  | 1 | 2 | 3 | 1 | 2 |
| (Meth)acrylic adhesive resin | 100 | 100 | 100 | 100 | 100 |
| Cross-linking agent | 0.2 | 0.2 | 0.2 | 0.2 | 0.2 |
| Quaternary ammonium salt | 0.3 | 0.4 | 0.5 | — | — |
| Ionic liquid compound   IP-P14 | — | — | — | 0.5 | — |
|                        IL-P20-2 | — | — | — | — | 0.5 |
| Silane coupling agent | 0.1 | 0.1 | 0.1 | 0.1 | 0.1 |
| Surface resistance (Ω/sq) | $10^{11}$ | $10^{11}$ | $10^{10}$ | $10^{10}$ | $10^{11}$ |
| Heat resistance | ○ | ○ | ○ | x | Δ |
| Humidity resistance | ○ | ○ | ○ | ○ | Δ |
| Metal corrosion resistance | ○ | ○ | ○ | Δ | x |

Units = parts by weight

As can be seen from the results in Table 1, the adhesive compositions of Examples 1-3 exhibited excellent characteristics in terms of resistance to heat and humidity without occurrence of voids or peeling. In contrast, the adhesive composition of Comparative Example 1 showed poor heat resistance and the adhesive composition of Comparative Example 2 was inferior in both heat resistance and humidity resistance. Further, the adhesive compositions of Examples 1-3 exhibited excellent characteristics in terms of resistance to corrosion of metal. In contrast, the adhesive compositions of Comparative Examples 1 and 2 exhibited corrosion of the aluminum foil.

The antistatic adhesive composition of an embodiment may be advantageously used due to its relatively low cost. In addition the antistatic adhesive composition of an embodiment may not cause the adhesive to become undesirably opaque.

The antistatic adhesive composition may not include particulates dispersed therein to impart antistatic properties. As such, the antistatic adhesive composition may avoid difficulties associated with controlling a size of dispersed particles and there may be no risk of birefringence. In addition, the lack of particulates to impart antistatic properties may also help avoid causing the adhesive to become opaque. Further, the antistatic adhesive composition of an embodiment may exhibit good solubility of the components included therein and may not cause an ionic compound to bleed into a surface of the adhesive layer. Moreover, the antistatic adhesive composition of an embodiment may not change inherent physical properties of the adhesive and additional reaction processes may be avoided.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:
1. An antistatic adhesive composition, comprising:
100 parts by weight of a (meth)acrylic adhesive resin, the (meth)acrylic adhesive resin having functional groups capable of bonding with a cross-linking agent;
about 0.01 to about 15 parts by weight of a cross-linking agent; and
about 0.1 to about 10 parts by weight of an ammonium salt, the ammonium salt being obtained by reacting an amine having three terminal hydroxyalkyl groups with one of an organic or inorganic acid, wherein:
the amine is a tertiary amine oligomer, and the tertiary amine oligomer has a weight average molecular weight of about 1,000 to about 2,000, and
the ammonium salt is represented by Formula 1:

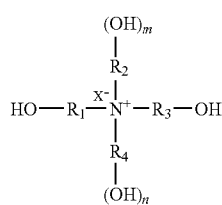

wherein:
$R_1$ and $R_3$ are each independently a $C_2$-$C_{12}$ linear alkyl, a $C_2$-$C_{12}$ branched alkyl, an alkoxyalkyl, or a carboxyalkyl, $R_2$ and $R_4$ are each independently hydrogen, a $C_1$-$C_{12}$ linear alkyl, a $C_1$-$C_{12}$ branched alkyl, an alkoxyalkyl, or a carboxyalkyl, provided that exactly one of $R_2$ and $R_4$ is hydrogen,
m and n are each independently 0 or 1, with the proviso that:
when $R_2$ is hydrogen, m=0 and n=1, and
when $R_4$ is hydrogen, m=1 and n=0, and
X is a counter anion derived from the organic or inorganic acid.

2. The antistatic adhesive composition as claimed in claim 1, wherein the ammonium salt is obtained by reacting the amine having three terminal hydroxyalkyl groups with the organic acid, the organic acid including at least one of p-toluenesulfonic acid, monochloroacetic acid, dichloroacetic acid, trichloroacetic acid, trifluoroacetic acid, and trifluoromethanesulfonic acid.

3. The antistatic adhesive composition as claimed in claim 1, wherein the ammonium salt is obtained by reacting the amine having three terminal hydroxyalkyl groups with at least one of HCl, HF, HBr, HI, $CH_3I$, $H_2SO_4$, and $H_3PO_4$.

4. The antistatic adhesive composition as claimed in claim 1, wherein the (meth)acrylic adhesive resin includes a copolymer, the copolymer including:
a $C_4$-$C_{12}$ alkyl (meth)acrylate, and
a polymerizable monomer having a functional group including at least one of a carboxyl group, a hydroxyl group, an amide group, and a tertiary amine group.

5. The antistatic adhesive composition as claimed in claim 4, wherein the copolymer further includes a comonomer.

6. The antistatic adhesive composition as claimed in claim 5, wherein the copolymer includes:
about 80 to about 99% by weight of the $C_4$-$C_{12}$ alkyl (meth)acrylate,
about 1 to about 10% by weight of the polymerizable monomer having a functional group including at least one of a carboxyl group, a hydroxyl group, an amide group, and a tertiary amine group, and
about 10% by weight or less of the comonomer.

7. The antistatic adhesive composition as claimed in claim 1, wherein the (meth)acrylic adhesive resin has a weight average molecular weight of about 50,000 to about 2,000,000.

8. The antistatic adhesive composition as claimed in claim 1, wherein the cross-linking agent includes at least one of an isocyanate compound, an epoxy compound, an aziridine compound, and a metal chelate.

9. The antistatic adhesive composition as claimed in claim 1, further comprising a silane coupling agent.

10. The antistatic adhesive composition as claimed in claim 9, wherein the composition includes about 0.01 to about 1 part by weight of the silane coupling agent, based on 100 parts by weight of the (meth)acrylic adhesive resin.

11. The antistatic adhesive composition as claimed in claim 9, wherein the silane coupling agent contains at least one epoxy group.

12. The antistatic adhesive composition as claimed in claim 1, further comprising an additive, the additive including at least one of curing accelerators, ionic liquids, inorganic fillers, softeners, antioxidants, anti-aging agents, stabilizers, stickiness-imparting resins, modified resins, leveling agents, defoaming agents, plasticizers, dyes, pigments, processing agents, UV blocking agents, fluorescent whitening agents, dispersants, heat stabilizers, light stabilizers, UV absorbers, antifungal agents, alkali metal salts, lubricants, and solvents.

13. An adhesive film, the adhesive film including the antistatic adhesive composition according to claim 1.

14. A method for producing an adhesive film, the method comprising:
preparing the antistatic adhesive composition according to claim 1; and
applying the antistatic adhesive composition to a release film.

15. The method as claimed in claim 14, wherein preparing the antistatic adhesive composition includes:
mixing the ammonium salt with the cross linking agent and the (meth)acrylic adhesive resin.

16. A method of fabricating a liquid crystal display, the method comprising:
providing an adhesive film including a release film and an antistatic adhesive composition, the antistatic adhesive composition including:
100 parts by weight of a (meth)acrylic adhesive resin, the (meth)acrylic adhesive resin having functional groups capable of bonding with a cross-linking agent,
about 0.01 to about 15 parts by weight of a cross-linking agent, and
about 0.1 to about 10 parts by weight of an ammonium salt, the ammonium salt being obtained by reacting an amine having three terminal hydroxyalkyl groups with one of an organic or inorganic acid, wherein:
the amine is a tertiary amine oligomer, and the tertiary amine oligomer has a weight average molecular weight of about 1,000 to about 2,000, and
the ammonium salt is represented by Formula 1:

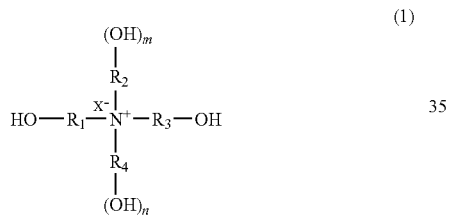

(1)

wherein:
$R_1$ and $R_3$ are each independently a $C_2$-$C_{12}$ linear alkyl, a $C_2$-$C_{12}$ branched alkyl, an alkoxyalkyl, or a carboxyalkyl,
$R_2$ and $R_4$ are each independently hydrogen, a $C_1$-$C_{12}$ linear alkyl, a $C_1$-$C_{12}$ branched alkyl, an alkoxyalkyl, or a carboxyalkyl, provided that exactly one of $R_2$ and $R_4$ is hydrogen,
m and n are each independently 0 or 1, with the proviso that:
when $R_2$ is hydrogen, m=0 and n=1, and
when $R_4$ is hydrogen, m=1 and n=0, and
X is a counter anion derived from the organic or inorganic acid;
removing the release film from the adhesive film; and
bonding a polarizer to a liquid crystal cell using the adhesive film from which the release film has been removed.

17. An antistatic adhesive composition, comprising:
100 parts by weight of a (meth)acrylic adhesive resin, the (meth)acrylic adhesive resin having functional groups capable of bonding with a cross-linking agent;
about 0.01 to about 15 parts by weight of a cross-linking agent; and
about 0.1 to about 10 parts by weight of an ammonium salt, the ammonium salt being obtained by reacting an amine having three terminal hydroxyalkyl groups with
one selected from the group consisting of HCl, HF, HBr, HI, $CH_3I$, $H_2SO_4$, and $H_3PO_4$, and
the ammonium salt is represented by Formula 1:

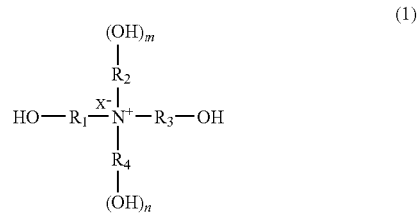

(1)

wherein:
$R_1$ and $R_3$ are each independently a $C_2$-$C_{12}$ linear alkyl, a $C_2$-$C_{12}$ branched alkyl, an alkoxyalkyl, or a carboxyalkyl,
$R_2$ and $R_4$ are each independently hydrogen, a $C_1$-$C_{12}$ linear alkyl, a $C_1$-$C_{12}$ branched alkyl, an alkoxyalkyl, or a carboxyalkyl, provided that exactly one of $R_2$ and $R_4$ is hydrogen,
m and n are each independently 0 or 1, with the proviso that:
when $R_2$ is hydrogen, m=0 and n=1, and
when $R_4$ is hydrogen, m=1 and n=0, and
X is a counter anion derived from the one selected from the group consisting of HCl, HF, HBr, HI, $CH_3I$, $H_2SO_4$, and $H_3PO_4$.

* * * * *